(12) United States Patent
Kothandaraman et al.

(10) Patent No.: US 10,012,158 B2
(45) Date of Patent: Jul. 3, 2018

(54) OPTIMIZATION-BASED CONTROLS FOR AN AIR HANDLING SYSTEM USING AN ONLINE REFERENCE GOVERNOR

(71) Applicant: Cummins Inc., Columbus, IN (US)

(72) Inventors: Govindarajan Kothandaraman, Columbus, IN (US); Hoseinali Borhan, Bloomington, IN (US); Bibin N. Patel, Columbus, IN (US)

(73) Assignee: Cummins Inc., Columbus, IN (US)

( * ) Notice: Subject to any disclaimer, the term of this patent is extended or adjusted under 35 U.S.C. 154(b) by 37 days.

(21) Appl. No.: 15/363,857

(22) Filed: Nov. 29, 2016

(65) Prior Publication Data

US 2018/0149099 A1     May 31, 2018

(51) Int. Cl.
*F02B 47/08*     (2006.01)
*F02D 41/00*     (2006.01)
*F02D 9/06*     (2006.01)
*F02D 41/14*     (2006.01)

(52) U.S. Cl.
CPC ............ *F02D 41/0077* (2013.01); *F02D 9/06* (2013.01); *F02D 41/0052* (2013.01); *F02D 41/146* (2013.01)

(58) Field of Classification Search
CPC .............. F02M 25/07; F02M 25/0707; F02M 25/0709; F02M 25/0772; F02D 2021/086; F02D 2041/0075; F02D 41/0052; F02D 41/062; F02D 41/0065; F02D 41/0077; F02D 41/24
USPC .... 123/568.11, 568.21, 568.23, 568.26, 672, 123/674; 701/101, 108, 114, 115
See application file for complete search history.

(56) References Cited

U.S. PATENT DOCUMENTS

| | | | |
|---|---|---|---|
| 6,467,469 B2 * | 10/2002 | Yang | F02D 41/0077 123/568.16 |
| 7,275,374 B2 | 10/2007 | Stewart et al. | |
| 7,281,518 B1 | 10/2007 | Allain et al. | |
| 7,328,074 B2 | 2/2008 | Das et al. | |
| 7,376,471 B2 | 5/2008 | Das et al. | |
| 7,587,253 B2 | 9/2009 | Rawlings et al. | |
| 7,725,199 B2 | 5/2010 | Brackney | |
| 8,078,291 B2 | 12/2011 | Pekar et al. | |
| 8,103,427 B2 | 1/2012 | Osburn et al. | |
| 8,145,329 B2 | 3/2012 | Pekar | |
| 8,880,321 B2 | 11/2014 | Sun et al. | |
| 9,482,169 B2 | 11/2016 | Hodzen | |

(Continued)

OTHER PUBLICATIONS

Henson, Michael A., Nonlineal Model Predictive Control:Current Status and Future Directors, Computers and Chemical Engineering, 1998, pp. 187-202.

(Continued)

*Primary Examiner* — John Kwon
(74) *Attorney, Agent, or Firm* — Taft Stettinius & Hollister LLP

(57) ABSTRACT

System, apparatus, and methods are disclosed for controlling one or more actuators of an air handling system of an internal combustion engine. The one or more actuators are controlled in response to one or more feedforward references that are adjusted by a reference governor that predicts one or more operating parameters and imposes constraints on the one or more feedforward references to reduce the potential for violating limits on the one or more operating parameters.

20 Claims, 3 Drawing Sheets

(56) References Cited

U.S. PATENT DOCUMENTS

| | | | |
|---|---|---|---|
| 9,885,297 B2* | 2/2018 | Wang | F02D 41/0007 |
| 2001/0021900 A1 | 9/2001 | Kassmann | |
| 2005/0143952 A1 | 6/2005 | Tomoyasu | |
| 2005/0228573 A1* | 10/2005 | Gangopadhyay | F02D 41/0052 |
| | | | 701/108 |
| 2006/0137346 A1 | 6/2006 | Stewart | |
| 2008/0071397 A1 | 3/2008 | Rawlings | |
| 2009/0088918 A1 | 4/2009 | Takenaka | |
| 2009/0306866 A1 | 12/2009 | Malikopoulos | |
| 2011/0154820 A1* | 6/2011 | Osburn | F02D 41/0007 |
| | | | 60/605.2 |
| 2011/0264353 A1 | 10/2011 | Atkinson et al. | |
| 2013/0276766 A1* | 10/2013 | Subramanian | F02D 41/0077 |
| | | | 123/568.21 |
| 2014/0109868 A1* | 4/2014 | Zhu | F02D 41/0072 |
| | | | 123/349 |
| 2016/0025020 A1* | 1/2016 | Hodzen | F02D 41/0065 |
| | | | 701/103 |
| 2016/0146130 A1* | 5/2016 | Haskara | F02D 41/005 |
| | | | 701/108 |
| 2016/0160771 A1* | 6/2016 | Wang | F02B 33/40 |
| | | | 123/564 |
| 2016/0237928 A1* | 8/2016 | Lana | F02D 13/02 |
| 2017/0145938 A1* | 5/2017 | Kothandaraman | F02D 41/0235 |

OTHER PUBLICATIONS

Herceg, Martin et al., Nonlinear Model Predictive Control of a Turbocharged Diesel Engine, Computer Aided Control System Design, pp. 1-6. 2006 IEEE International Conference on Control Applications.

Stewart, Gregory et al., A Model Predictive Control Framework for Industrial Turbodiesel Engine Control, Dec. 9-11, 2008, pp. 5704-5711, 47th IEEE Conference on Decision and Control.

Jankovic, Mrdjan et al., Constructive Lyapunov Control Design for Turbocharged Diesel Engines, Mar. 2, 2008, pp. 288-299, IEEE Transactions on Control Systems Technology, vol. 8, No. 2.

* cited by examiner

OPTIMIZATION-BASED CONTROLS FOR AN AIR HANDLING SYSTEM USING AN ONLINE REFERENCE GOVERNOR

BACKGROUND

The present application generally relates to optimization-based control methods, systems and apparatus for internal combustion engines including an air handling system, and more particularly to controlling air handling system actuators in such systems. In certain engine operating conditions, desired emission limits can be violated due to transients, disturbances, and/or other variations in the engine system. Existing approaches in maintaining desired emissions limits do not provide adequate air handling control responses to these operating conditions and suffer from a number of limitations and shortcomings. Therefore, a need remains for further improvements in systems, apparatus, and methods for controlling air handling systems.

SUMMARY

Embodiments include a unique system, method, and apparatus including a reference governor to adjust references that control one or more air handling actuators in an air handling system of an internal combustion engine. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
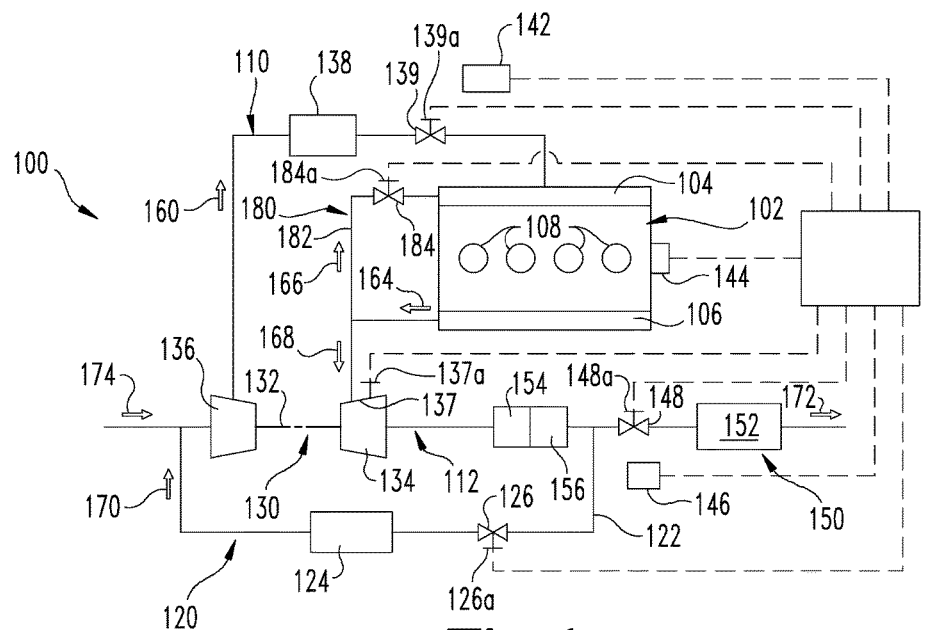
FIG. 1 is a schematic illustration of a system including an example internal combustion engine and air handling system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an air handling system 100 that includes an internal combustion engine 102 in fluid communication with an intake system 110. A charge flow 160 enters an intake manifold 104 of the engine 102, and an exhaust flow 164 from combustion in engine 102 exits via an exhaust system 112 that includes an exhaust manifold 106 of the engine 102, it being understood that not all details of these systems that are typically present are shown. Engine 102 includes a number of cylinders 108 forming combustion chambers 109 (FIG. 2) into which fuel flow 162 is injected by fuel injectors (not shown) to combust with the charge flow 160 that has entered through the intake system 110 to the intake manifold 104.

Figure 2:
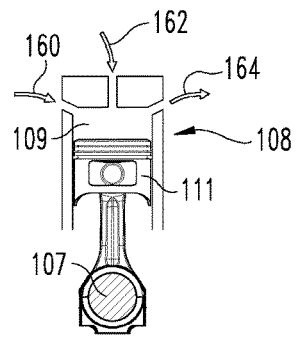
FIG. 2 is a schematic illustration of a cylinder of the internal combustion engine of FIG. 1.

As shown in FIG. 2, intake valves (not shown) control the admission of a charge flow 160 into the combustion chamber 109 of each of the cylinders 108. A piston 111 is housed in the combustion chamber 109 and is operable to move up and down in cylinder 108 to drive a crankshaft 107 in response to combustion of fuel flow 162 and charge flow 160 in combustion chamber 109. Exhaust valves (not shown) control the outflow of exhaust flow 164 from the combustion chambers 109 through exhaust system 112 and ultimately to the atmosphere.

The air handling system 100 further includes a turbocharger 130, such as a fixed geometry turbocharger including a wastegate, or a variable geometry turbocharger (VGT), for example. Turbocharger 130 is operable to compress ambient air and, as discussed further below, low pressure (LP) exhaust gas recirculation (EGR) flow 170 before the ambient air and LP EGR flow 170 (if provided) enters the intake manifold 104 of the engine 102 at increased pressure. The turbocharger 130 includes a shaft 132 connecting a turbine 134 connected to the exhaust system 112 and a compressor 136 connected to the intake system 110. The air handling system 100 further includes a charge after cooler (CAC) 138, operable to cool the charge flow 160 provided to intake manifold 104. The air handling system 100 may also include an intake throttle 139 downstream of CAC 138 to assist in control of the charge flow 160 to intake manifold 104. Other embodiments may include bypass (not shown) around CAC 138 and/or a bypass (now shown) around compressor 136 and/or various other components not shown.

The air handling system 100 may also include a LP EGR loop 120, including an EGR conduit 122 connecting the intake system 110 and the exhaust system 112 downstream of turbine 134 and upstream of compressor 136. A LP EGR valve 126 is provided for controlling the LP EGR flow 170 from the exhaust system 112 to the intake system 110 through LP EGR conduit 122, and a LP EGR cooler 124 is provided for cooling the LP EGR flow 170 before it is mixed with a fresh air flow 174 upstream of or at the inlet of compressor 136. It is contemplated that in certain embodiments the cooler 124 may not be present and/or a controllable bypass is provided to bypass all or a portion of the LP EGR flow 170 around LP EGR cooler 124.

The air handling system 100 may also include a high pressure (HP) EGR loop 180, including a HP EGR conduit 182 connecting the intake system 110 and the exhaust system 112 upstream of turbine 134 and downstream of compressor 136. A HP EGR valve 184 is provided for controlling the HP EGR flow 166 from the exhaust system 112 to the intake manifold 104 of intake system 110 through HP EGR conduit 182 for mixing with the compressed combined LP EGR flow 170 (if any) and fresh air flow 174 from compressor 136. The mixture of fresh air flow 174 and any LP EGR flow 170 from compressor 136 is pumped through the intake system 110, to the intake manifold 104 for mixing with any HP EGR flow 166 to provide the charge flow 160 into the engine cylinders 108, typically producing torque on the crankshaft 107. The portion 168 of the exhaust flow 164 not recirculated as HP EGR flow 168 is provided to turbine 134, and the part of the portion 168 of exhaust flow 164 that passes through turbine 134 that is not recirculated as LP EGR flow 170 is provided as exhaust outflow 172 to an aftertreatment system 150.

It shall be appreciated that the air handling system 100 is but one non- limiting illustrative embodiment of an air handling system to which the principles and techniques disclosed herein may be applied. A variety of alternate air handling system configurations and components may be utilized including, for example, air-handling systems with and without turbochargers, with multiple turbochargers, or other types of superchargers. Exemplary forced induction systems may include one or more variable geometry turbochargers (VGTs), fixed geometry turbochargers, wastegated turbochargers, twin-turbochargers, series or parallel configurations of multiple turbochargers, symmetric or asymmetric combinations of turbochargers, and/or superchargers.

It shall be further appreciated that exemplary air handling systems may include charge air coolers with or without charge air cooler bypass valves, intake throttle valves, exhaust throttle valves, EGR valves, compressor bypass valves and/or as other types of air-handling actuators. A variety of EGR systems and configurations may be utilized including, for example, low pressure loop EGR, high pressure loop EGR, direct EGR, and/or EGR dedicated to one or more cylinders. Certain embodiments may include EGR loops with hot side EGR valves or cold side EGR valves. Certain embodiments may comprise systems including EGR bypass valves. Some embodiments may comprise non-EGR systems which omit EGR structure and functionality. For example, in some embodiments only one of LP EGR loop 120 and HP EGR loop 180 is provided.

In one embodiment, aftertreatment system 150 includes an SCR catalyst 152 downstream of an exhaust throttle 148. Exhaust throttle 148 is located downstream of LP EGR loop 120. Aftertreatment system 150 may further include an oxidation catalyst 154 and a particulate filter 156 upstream of LP EGR loop 120 and SCR catalyst 152, and downstream of turbine 134. Reductant injection may also be provided between the oxidation catalyst 154 and particulate filter 156, and/or upstream of SCR catalyst 152. Other aftertreatment components may also be provided and are not limited to those shown. In addition one or more of the shown aftertreatment components can be omitted or re-positioned from what is shown in FIG. 1.

In the illustrated embodiment, the air handling system 100 includes one or more air handling sensors 142. Example air handling sensors 142 may include a mass air flow (MAF) sensor, an ambient air temperature sensor, an ambient air pressure sensor, and an intake pressure sensor, each associated with the intake system 110. The air handling sensor(s) 142 may also include an intake manifold pressure (IMAP) sensor in fluid communication with the intake manifold 104 or any other position within the intake system 110 or the intake manifold 104. Air handling sensors 142 can be at any location that provides a suitable indication of applicable intake system 110 and intake manifold 104 readings.

In one embodiment, the air handling sensors 142 include an IMAP sensor is operative to sense the air pressure in the intake manifold 104, and the MAF sensor is operative to sense the flow rate of air entering the engine 102, which can be utilized to calculate an EGR fraction. The EGR fraction provides an indication of the amount of LP EGR flow 170 and/or HP EGR flow 166 being supplied to the intake manifold 104 relative to the fresh air flow 174. However, any suitable method for determining the EGR fraction is contemplated.

The engine 102 may further include a number of engine sensors 144, such as an engine speed sensor and fuel sensors. The air handling system 100 may further include a number of exhaust sensors 146, such as an oxygen sensor and/or a NOx sensor in fluid communication with the exhaust system 112, and an exhaust manifold pressure sensor in fluid communication with the exhaust manifold 106. The oxygen sensor is operable to provide a measurement of the level or amount of oxygen in the exhaust flow 164 from engine 102. The oxygen sensor may be a true oxygen sensor, lambda sensor, or any type of sensor from which the oxygen level in the exhaust gas can be determined. The NOx sensor is operable to provide a measurement of the amount or level of NOx in the exhaust flow 164 from engine 102. Each of the oxygen sensor, the NOx sensor, and the exhaust manifold pressure sensor need not be in direct communication with the exhaust system 112 or exhaust manifold 106, and can be located at any position within the exhaust system 112 or exhaust manifold 106 that provides a suitable indication of applicable exhaust system 112 or exhaust manifold 106 readings. In certain embodiments, the oxygen sensor and NOx sensor may be located upstream and/or downstream of an aftertreatment system 150 for NOx reduction. It is contemplated that in certain embodiments the $NO_x$ sensor may additionally provide for oxygen detection.

It shall be appreciated that the foregoing sensors and sensor arrangements are but several non-limiting, illustrative embodiments of sensors and sensor systems to which the principles and techniques disclosed herein may be applied. A variety of other types of sensors and sensor configurations may be utilized including EGR flow sensors, boost pressure sensors, and/or exhaust temperature sensors to name but a few examples. It shall further be appreciated that the sensors which are utilized may be physical sensors, virtual sensors and/or combinations thereof.

The air handling system 100 includes a controller 140 structured to perform certain operations to receive and interpret signals from any component and sensor of the air handling system 100. It shall be appreciated that the controller 140, or control module, may be provided in a variety of forms and configurations including one or more computing devices forming a whole or part of a processing subsystem having non-transitory memory storing computer executable instructions, processing, and communication hardware. The controller 140 may be a single device or a distributed device, and the functions of the controller 140 may be performed by hardware or instructions encoded on a computer readable medium. The controller 140 is in communication with any actuators, sensors, datalinks, computing devices, wireless connections, or other devices to be able to perform any described operations.

The controller 140 includes stored data values, constants, and functions, as well as operating instructions stored on computer readable medium. Any of the operations of exemplary procedures described herein may be performed at least partially by the controller. Other groupings that execute similar overall operations are understood within the scope of the present application. Modules may be implemented in hardware and/or software on one or more computer readable media, and modules may be distributed across various hardware or software components. More specific descriptions of certain embodiments of controller operations are discussed herein in connection with FIGS. 3-5. Operations illustrated are understood to be exemplary only, and operations may be combined or divided, and added or removed, as well as re-ordered in whole or in part.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

The controller 140 is operatively coupled with and structured to store instructions in memory which are readable and executable by the controller 140 to operate air and fuel handling control valves, such as the LP EGR control valve 126, the HP EGR control valve 184, the intake throttle 139, a controllable inlet or wastegate 137 of turbine 134, and the exhaust throttle 148, for example. In one embodiment, controller 140 controls a position of one or more air handling valves or throttles by being operatively coupled with the associated one or more of LP EGR control valve actuator 126a, the HP EGR control valve actuator 184a, the intake throttle actuator 139a, the controllable turbine inlet or wastegate actuator 137a, and the exhaust throttle actuator 148a associated with respective ones of the LP EGR control valve 126, the HP EGR control valve 184, the intake throttle 139, the controllable turbine inlet or wastegate 137, and the exhaust throttle 148.

Figure 3:
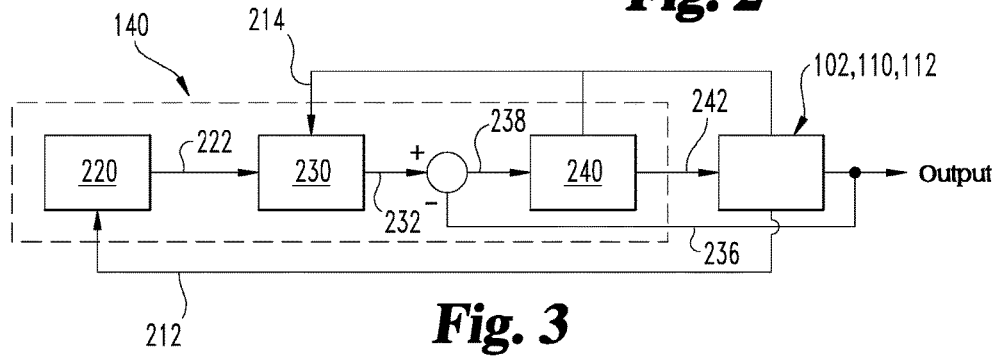
FIG. 3 is a diagram illustrating an example control scheme for controlling one or more actuators in the air handling system of FIG. 1
Figure 5:
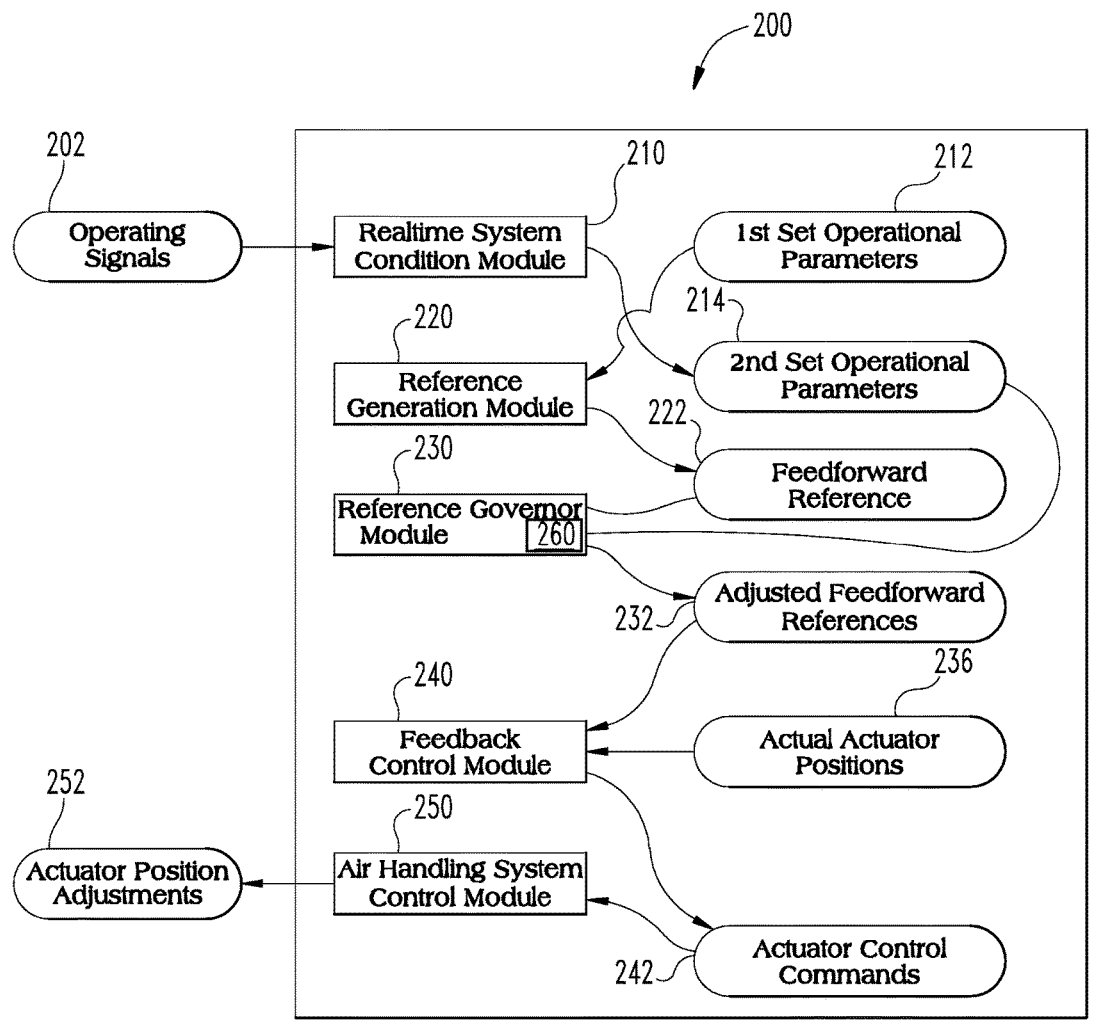
FIG. 5 is a diagram illustrating an example controller apparatus of the system of FIG. 1.

One example embodiment of a controller arrangement including controller 140 is shown in FIG. 3 and also in FIG. 5. Controller 140 includes a control apparatus 200 including a reference generation module 220, a reference governor or reference governor module 230, and a feedback control module 240 connected to a plant or prime mover, such as engine 102 with intake system 110 and exhaust system 112. Reference generation module 220 provides one or more feedforward references 222 based on a first set of operational parameters 212 that include one or more operating conditions of engine 102, intake system 110 and/or exhaust system 112.

The feedforward references 222 establish or indicate a feedforward position achieved by the associated actuator of one or more the LP EGR control valve 126, the HP EGR control valve 184, the intake throttle 139, the controllable turbine inlet or wastegate 137, the exhaust throttle 148, and/or any other air handling device controlled by an actuator in system 100. In one embodiment, the feedforward references 222 are determined from one or more reference tables stored in a memory of controller 140 for one or more of the LP EGR control valve 126, the HP EGR control valve 184, the intake throttle 139, the controllable turbine inlet or wastegate 137, and the exhaust throttle 148 based on a NOx feedback operational parameter 212.

Figure 4:
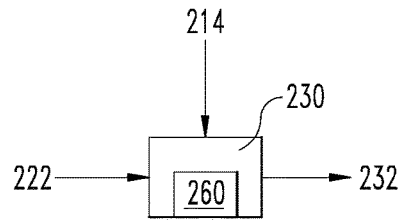
FIG. 4 is a diagram illustrating an example reference governor of the control scheme of FIG. 3.

Reference governor module 230, also shown in FIG. 4, receives the feedforward references 222 from reference generation module 220 and determines an adjustment for the feedforward references 222. For example, reference generation module 220 provides feedforward references 222 to reference governor module 230, which applies an adjustment to feedforward references 222 based on a second set of operational parameters 214. Reference governor module 230 provides adjusted feedforward references 232 to a feedback control module 240 which is configured to determine an actuator control command for positioning of the one or more the valves, throttles and/or inlets described above. In one embodiment, the adjusted feedforward references 232 are determined by applying model predictive control to feedforward references 222 to account for transients, disturbances or other variable operating conditions indicated by the second set of operational parameters 214.

For example, feedforward references 222 can be based on steady state conditions of system 100 indicated by the first set of operational parameters 212, and reference governor module 230 provides an online adjustment of these feedforward references 222 by applying a predictive, optimized model 260 of system 100 in response to the second set of operational parameters 214 indicative of transients, disturbances or other variable operating conditions of system 100. In one embodiment, the first set of operational parameters 212 are operating condition outputs of system 100 indicative of steady state conditions, and the second set of operational parameters 214 are operating condition outputs of system 100 indicative of transient conditions, disturbances, or other variable conditions. The reference governor module 230 provides an optimal approach based on a prediction of outputs to enforce constraints on the feedforward references 222. Accordingly, based on the second set of operational parameters, the feedforward references 222 are optimally re-shaped or adjusted online during transients around the steady state tables that provide the feedforward references 222 based on the first set of operational parameters 212.

The reference governor module 230 is an "add-on" approach to existing control schemes for determining the air handling feedforward references 222 and does not require or involve re-programming or re-calibration of existing control schemes to determine the adjusted feedforward references 232. Reference governor module 230 is configured to enforce point wise-in-time output and control constraints by optimal modification of the feedforward references 222 to a closed loop control system. The adjusted feedforward references 232 can be as close as possible to the feedforward references 222 subject to satisfying the desired constraints imposed by model 260 programmed in reference governor module 230 that predicts system outputs based on the second set of operational parameters 214 and imposes adjustments on the original feedforward references 222 that are subject to the predicted system outputs and desired constraints.

The adjusted feedforward references 232 are provided to an error determiner 234, which determines a difference between the adjusted feedforward references 232 and the actual references 236, i.e. the current position of the one or more the LP EGR control valve 126, the HP EGR control valve 184, the intake throttle 139, the controllable turbine inlet or wastegate 137, and the exhaust throttle 148. The error determination 238 is provided to feedback control module 240, which outputs one or more actuator control commands 242 that control the position of the respective actuators of one or more of LP EGR control valve 126, the HP EGR control valve 184, the intake throttle 139, the controllable turbine inlet or wastegate 137, and the exhaust throttle 148 based on the adjusted feedforward references 232.

In one embodiment, controller apparatus 200 includes a real time system conditions module 210 that receives operating signals 202 from the various sensors 142, 144, 146 and determines the first set of operation parameters 212 and the second set of operational parameters 214. Operating signals 202 can include a number of inputs representing received signals from various sensors 142, 144, 146 associated with the air handling system 100 described in FIG. 1. Example inputs can include one or more of an engine speed input, an engine out air-fuel ratio (AFR) input, a charge air flow input, an EGR flow input (LP EGR flow and/or HP EGR flow input), an EGR fraction input, an oxygen level input, a mass air flow input, an ambient air temperature input, an ambient air pressure input, an engine out NOx input, an intake manifold pressure input, an exhaust manifold pressure input, and a compressor flow rate input. It is contemplated that inputs to controller 140 can come from sensors, virtual or real, and/or be calculated and/or estimated based on, for example, other sensors and/or engine operating conditions. It is further contemplated that the inputs described herein are exemplary only, and certain embodiments may contain fewer, additional and/or alternative inputs.

The real time system condition module 210 is structured to receive and interpret inputs to the controller 140 from operating signals 202. In an example embodiment, the real time system condition module 210 is further structured to determine operational state information based at least in part on the inputs from operating signals 202, and provide at least a portion of the operational state information as first set of operational parameters 212 and second set of operational parameters 214.

The reference governor module 230 can include a model 260 that is one or more linearization models, real-time cost function models, or any other suitable predictive control model to predict one or more operating conditions upon which to base the adjustment in the feedforward references 222. For example, the linearization model can be structured to calculate a set of parameters for a linear time-varying model of the engine based on at least the second set of operational parameters 214 received from system condition module 210 and a physical model of the engine over the space of operational states. The linearization model is further structured to provide the set of parameters to the real-time cost function model.

The real-time cost function model in reference governor module 230 is structured to receive and interpret the second set of operational parameters 214 from the system condition module 210 and the set of parameters from the linearization model. In an example embodiment, the real-time cost function model is structured to run a cost function, tracking the set of parameters over a prediction horizon. The real-time cost function model may determine a solution of the cost function in a number of manners including, for example minimizing the cost function, maximizing the cost function, determining incremental solutions, converging or iteratively approaching a minimization or maximization or another value which is selected for convergence. It shall be appreciated that minimization and maximization need not be absolute and that values differing from the absolute theoretical or practical minimum or maximum of a given function may be utilized for minimization or maximization operations. The cost function may be minimized subject to the set of parameters from the linear model and at least one physical constraint of the engine. In certain embodiments, because the linear model may be reconfigurable as a function of the operational state information, the cost function may be minimized in real-time using fast quadratic programming methods, for example, while the engine is running, which could be continuous or at discrete points in time. It is contemplated that in certain embodiments the cost function may be maximized. The reference governor module 230 is further structured to provide one or more adjusted feedforward references 232 to feedback control module 240.

In yet a further embodiment, an air handling system controls module 250 is provided that is structured to receive and interpret the actuator control command(s) 242 from the feedback control module 240. In an example embodiment, the air handling system controls module 250 interprets the actuator control command(s) 242 and provides at least one air handling system actuator positon adjustment 252 over a control sampling period. It is contemplated that the actuator control commands 242 may include more than one command to manipulate one or more air handling actuators, including the LP EGR control valve actuator 126a, the HP EGR control valve actuator 184a, the intake throttle actuator 139a, the controllable turbine inlet or wastegate actuator 137a, and the exhaust throttle actuator 148a or any other air handling actuator, including intake and exhaust valves for the cylinders 108.

In certain embodiments, where the air handling system 100 is electrically connected an on-board diagnostic (OBD) output device (not shown), the actuator control command 242 may be provided to the on-board diagnostic output device for displaying the results of a diagnostic test or a position of one or more of the air handling actuators. It should be appreciated that the OBD output device may be any suitable device for displaying a result of the OBD tests to a user, operator, service technician, or other party, and may include, but is not limited to, an indicator lamp, a gauge, a printer, a memory device, an audible alarm, a display device, and/or other suitable output device.

Figure 6:
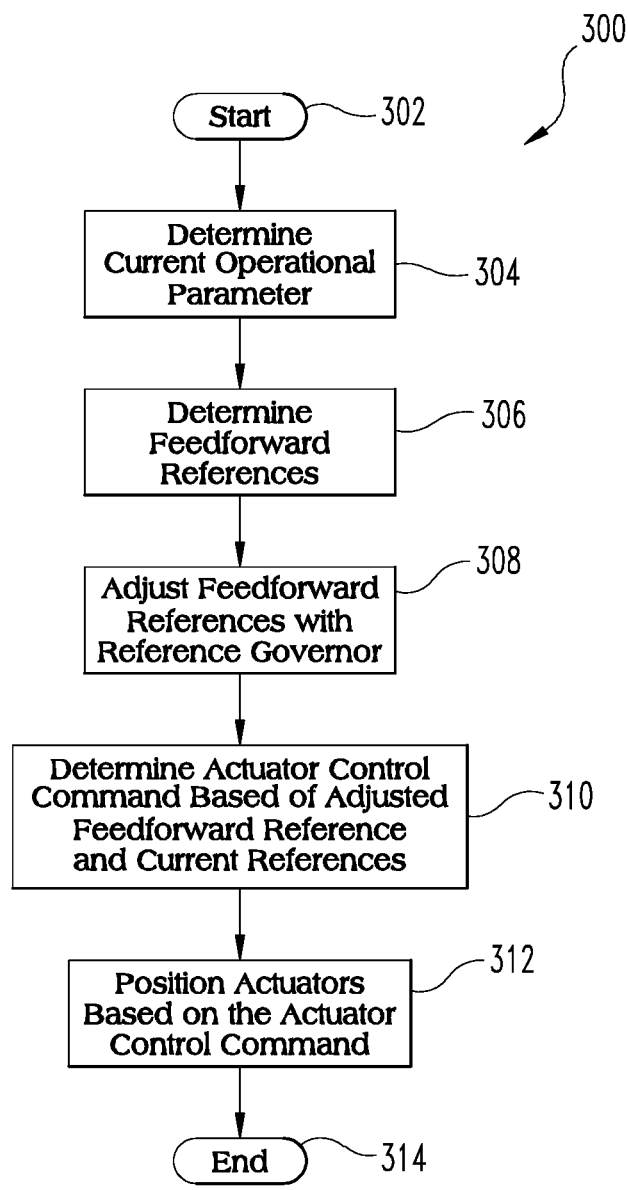
FIG. 6 is a flow diagram of a procedure that can be performed in conjunction with controlling one or more actuators in the air handling system of FIG. 1.

The schematic flow diagram in FIG. 6 and related description which follows provides an illustrative embodiment of performing procedures for controlling the air handling system 100 in response to engine emission or other variations. Operations illustrated are understood to be exemplary only, and operations may be combined or divided, and added or removed, as well as re-ordered in whole or part. Certain operations illustrated may be implemented by a computer executing a computer program provided on a non-transitory computer readable storage medium, where the computer program comprises instructions causing the computer to execute one or more of the operations, or to issue commands to other devices to execute one or more of the operations.

Example procedure 300 for controlling air handling actuators may be implemented in controller 140, for example. Procedure 300 begins at operation 302 which may begin by interpreting a key-on event and/or by initiation by an operator or technician. Operation 302 may alternatively or additionally include interpreting a communication or other parameter indicating that operation of a sampling interval is going to re-start procedure 300 upon completion of procedure 300.

Procedure 300 continues from operation 302 to operation 304, where current operational parameters of the air handling system 100 are determined by measurement and/or calculation. A first set of the operational parameters is then used to determine one or more feedforward references 222 for one or more set points of the engine 102 in operation 306. In certain embodiments, the set points may include a desired AFR, a desired charge flow, and/or a desired EGR fraction ratio. It should be appreciated that the air handling system feedforward references 222 may be determined from a reference table or calculated.

From operation 306, procedure 300 continues to operation 308, where reference governor 230 employs a second set of operational parameters to determine if one or more limits are predicted to be violated, such as a NOx limit. The reference governor 230 applies adjustments to the feedforward references 222 within a given set of limits or constraints to reduce the potential for predicted limit violations.

In one specific example, the reference governor 230 is configured to perform at operation 308 a real-time calculation to minimize or reduce potential NOx limit violations. The second set of operational parameters 214 provided to the reference governor 230 includes an engine-out NOx measurement, and the reference governor predicts engine out NOx output ($\delta$NOx) using the model:

$$\delta NOx\,(k+1)=\delta NOx(k)+b_1\delta EGR_r+b_2\delta CF_r. \quad \text{Equation 1}$$

The reference governor then calculates the adjusted EGR flow feedforward reference ($\delta EGR_r$) and adjusted charge flow feedforward reference ($\delta CF_r$) that minimizes the following cost function subject to the constraints in Equations 3 and 4:

$$\min_{\delta EGR_r,\,\delta CF_r} \Sigma_{i=k}^{k+M}(w_1 \delta EGR_r^2 + w_2 \delta CF_r^2) + \Sigma_{i=k}^{k+N} w_3(\max\{\delta NOx,\,0\})^2 \quad \text{Equation 2}$$

$$\delta EGR_{min} \leq \delta EGR_r \leq \delta EGR_{max} \quad \text{Equation 3}$$

$$\delta CF_{min} \leq \delta CF_r \leq \delta CF_{max} \quad \text{Equation 4}$$

where i is the sample time, k is the current sample time, N is the prediction horizon, M is the control horizon, and b and w are model coefficients.

From operation 308, procedure 300 continues to operation 310, where the adjusted feedforward references 232 from the reference governor 230 and actual references 236 are provided to a feedback controller, which determines an actuator control command 242 to adjust the air handling actuators to the determined position that satisfies the adjusted feedforward references 232 determined by the reference governor 230. The position of air handling system actuators may be set to regulate the charge flow and the EGR fraction, for example.

Procedure 300 continues from operation 310 to operation 312, where actuator control commands 242 are implemented to set the position of the air handling system actuators in response to the adjusted feedforward references 232. In certain embodiments, the actuator control commands 242 are implemented over a control sampling period of time in the framework of a model predictive control. In certain embodiments, the actuator position commands 242 may include an exhaust valve position command, an intake valve position command, a turbocharger geometry command, a wastegate position command, a LP EGR valve position command, a HP EGR valve position command, an intake throttle position command, and/or an exhaust throttle position command.

From operation 312, procedure 300 continues to operation 314, where procedure 300 ends. It is contemplated that in certain embodiments procedure 300 will be automatically repeated (i.e. restarts at operation 302) at a next control sampling time when procedure 300 ends.

Various aspects of the systems, apparatus, and methods are disclosed herein. For example, one aspect involves a method that includes operating a system including an internal combustion engine and an air handling system, the air handling system including an exhaust system and an intake system, the intake system structured to provide a charge flow to the internal combustion engine, and the charge flow includes a fresh air flow and an EGR flow. The method further includes determining one or more feedforward references for the charge flow and the EGR flow based on a first set of operational parameters of the system; adjusting the one or more feedforward references in response to a second set of operational parameters predictive of one or more of a transient condition and a disturbance of the system; determining one or more control commands for one or more actuators of the air handling system that control at least one of the charge flow and the EGR flow based on the adjusted one or more feedforward references and a current reference of each of the one or more actuators; and positioning the one or more actuators of the air handling system in response to the one or more control commands.

In one embodiment, the one or more feedforward references indicate an EGR valve position and an exhaust throttle position. In a refinement of this embodiment, the EGR valve positon includes a high pressure EGR valve position and a low pressure EGR valve position.

In another embodiment of the method, determining and adjusting the one or more feedforward references and determining the one or more control commands are repeated over a plurality of time periods over which the first set of operational parameters and the second set of operational parameters are time variant.

In still another embodiment, the adjusted one or more feedforward references and the current reference of each of the one or more actuators are provided to a feedback controller that determines the one or more control commands in response to a difference between the adjusted one or more feedforward references and the current reference of each of the one or more actuators.

In a refinement of the above embodiment, the method includes adjusting the one or more feedforward references in response to the second set of operational parameters with a reference governor. In a further refinement, the reference governor is configured to adjust the one or more feedforward references in response to one or more physical constraints on the output of the internal combustion engine. In yet a further refinement, the one or more physical constraints include a NOx limit.

In another refinement, the reference governor includes a predictive model to predict at least one operating parameter based on the second set of operational parameters and the at least one operating parameter is subject to the one or more physical constraints. In still another refinement, the one or more feedforward references are determined from one or more reference tables based on the first set of operational parameters.

In another embodiment, the first and second sets of operational parameters each include at least one of an air to fuel ratio, a mass air flow, an ambient air pressure, an EGR mass flow rate, a compressor mass flow rate, a turbine mass flow rate, a charge flow, an EGR fraction, an exhaust manifold pressure, an intake manifold temperature, an intake manifold pressure, and an engine-out NOx state.

According to another aspect, a system includes an internal combustion engine and an air handling system. The air handling system includes an exhaust system and an intake system. The intake system is structured to provide a charge flow to the internal combustion engine, and the air handling system also includes an EGR system connecting the intake system and the exhaust system. The air handling system also includes a plurality of actuators for controlling the charge flow, an exhaust flow, and an EGR flow. The system further includes a controller operatively coupled with the air handling system and the internal combustion engine. The controller is structured to perform the following operations during operation of the engine: determine one or more feedforward references for the charge flow and the EGR flow based on a first set of operational parameters of the system; adjust the one or more feedforward references in response to a second set of operational parameters; determine one or more control commands for one or more actuators of the air handling system that control at least one of the charge flow, the exhaust flow and the EGR flow based on the adjusted one or more feedforward references; and control positioning of the plurality of actuators of the air handling system based at least in part upon the one or more control commands.

In one embodiment, the controller includes a reference governor that is configured to receive the one or more feedforward references and the second set of operational parameters, determine the adjusted one or more feedforward references, and output the adjusted one or more feedforward references to a feedback controller. In a refinement of this embodiment, the feedback controller is configured to receive current references for the plurality of actuators and the adjusted one or more feedforward references. The feedback controller is configured to determine the one or more control commands for the plurality of actuators in response to a difference between the current references and the adjusted one or more feedforward references.

In another embodiment, the plurality of actuators includes at least one EGR valve in the EGR system and an exhaust throttle in the exhaust system. In a refinement of this embodiment, the at least one EGR valve includes a low pressure EGR valve in a low pressure EGR loop and a high pressure EGR valve in a high pressure EGR loop.

In yet another embodiment, the exhaust system includes a turbocharger and an exhaust throttle. The EGR system includes a low pressure EGR loop including a low pressure EGR valve and a high pressure EGR loop including a high pressure EGR valve. The plurality of actuators include actuators associated with each of the turbocharger, the exhaust throttle, the low pressure EGR valve, and the high pressure EGR valve. The controller is configured to control a position of the plurality of actuators in response to the one or more control commands.

According to another aspect, an apparatus includes an electronic controller in operative communication with a plurality of sensors operable to provide signals indicative of operational parameters of a system. The system includes an engine and an air handling system operationally coupled to the engine. The air handling system includes an exhaust system and an intake system connected by an EGR system, the intake system being structured to provide a charge flow to the engine. The electronic controller includes a real-time system condition module structured to determine a first set of operational parameters and a second set of operational parameters of the system based upon the signals provided by the plurality of sensors. The electronic controller also includes a reference generation module structured to determine one or more feedforward references for the charge air flow and an EGR flow in response to the first set of operational parameters. The electronic controller further includes a reference governor module structured to determine adjustments to the one or more feedforward references in response to the second set of operational parameters. The electronic controller also includes a feedback control module structured to determine one or more actuator control commands in response to the one or more adjusted feedforward references and current references for the charge flow and the EGR flow and an air handling system controls module structured to control a position of the one or more actuators in response to the one or more actuator control commands.

In one embodiment, the second set of operational parameters includes an actual engine out NOx amount and an engine out NOx constraint and the one or more actuator control commands are provided to position the one or more actuators to control an EGR valve in the EGR system and an exhaust throttle in the exhaust system. In another embodiment, the exhaust system includes an EGR loop including an EGR valve, and the at least one of the air handling system control command and the air handling system diagnostic command further includes an EGR valve position command.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a system including an internal combustion engine and an air handling system, the air handling system including an exhaust system and an intake system, the intake system structured to provide a charge flow to the internal combustion engine, wherein the charge flow includes a fresh air flow and an exhaust gas recirculation (EGR) flow;
   determining one or more feedforward references for the charge flow and the EGR flow based on a first set of operational parameters of the system;
   adjusting the one or more feedforward references in response to a second set of operational parameters predictive of one or more of a transient condition and a disturbance of the system;
   determining one or more control commands for one or more actuators of the air handling system that control at least one of the charge flow and the EGR flow based on the adjusted one or more feedforward references and a current reference of each of the one or more actuators; and
   positioning the one or more actuators of the air handling system in response to the one or more control commands.

2. The method of claim 1, wherein the one or more feedforward references indicate an EGR valve position and an exhaust throttle position.

3. The method of claim 2, wherein the EGR valve positon includes a high pressure EGR valve position and a low pressure EGR valve position.

4. The method of claim 1, wherein determining and adjusting the one or more feedforward references and determining the one or more control commands are repeated over a plurality of time periods over which the first set of operational parameters and the second set of operational parameters are time variant.

5. The method of claim 1, wherein the adjusted one or more feedforward references and the current reference of each of the one or more actuators are provided to a feedback controller that determines the one or more control commands in response to a difference between the adjusted one or more feedforward references and the current reference of each of the one or more actuators.

6. The method of claim 5, further comprising adjusting the one or more feedforward references in response to the second set of operational parameters with a reference governor.

7. The method of claim 6, wherein the reference governor is configured to adjust the one or more feedforward references in response to one or more physical constraints on the output of the internal combustion engine.

8. The method of claim 7, wherein the one or more physical constraints include a NOx limit.

9. The method of claim 7, wherein the reference governor includes a predictive model to predict at least one operating parameter based on the second set of operational parameters and the at least one operating parameter is subject to the one or more physical constraints.

10. The method of claim 6, wherein the one or more feedforward references are determined from one or more reference tables based on the first set of operational parameters.

11. The method of claim 1, wherein the first and second sets of operational parameters each include at least one of an air to fuel ratio, a mass air flow, an ambient air pressure, an EGR mass flow rate, a compressor mass flow rate, a turbine mass flow rate, a charge flow, an EGR fraction, an exhaust manifold pressure, an intake manifold temperature, an intake manifold pressure, and an engine-out NOx state.

12. A system, comprising:
an internal combustion engine;
an air handling system including an exhaust system and an intake system, the intake system structured to provide a charge flow to the internal combustion engine, the air handling system including an exhaust gas recirculation (EGR) system connecting the intake system and the exhaust system, the air handling system including a plurality of actuators for controlling the charge flow, an exhaust flow, and an EGR flow; and
a controller operatively coupled with the air handling system and the internal combustion engine;
wherein the controller is structured to perform the following operations during operation of the engine:
determine one or more feedforward references for the charge flow and the EGR flow based on a first set of operational parameters of the system;
adjust the one or more feedforward references in response to a second set of operational parameters;
determine one or more control commands for one or more actuators of the air handling system that control at least one of the charge flow, the exhaust flow and the EGR flow based on the adjusted one or more feedforward references; and
control positioning of the plurality of actuators of the air handling system based at least in part upon the one or more control commands.

13. The system of claim 12, wherein the controller includes a reference governor that is configured to receive the one or more feedforward references and the second set of operational parameters, determine the adjusted one or more feedforward references, and output the adjusted one or more feedforward references to a feedback controller.

14. The system of claim 13, wherein the feedback controller is configured to receive current references for the plurality of actuators and the adjusted one or more feedforward references, the feedback controller further being configured to determine the one or more control commands for the plurality of actuators in response to a difference between the current references and the adjusted one or more feedforward references.

15. The system of claim 12, wherein the plurality of actuators includes at least one EGR valve in the EGR system and an exhaust throttle in the exhaust system.

16. The system of claim 15, wherein the at least one EGR valve includes a low pressure EGR valve in a low pressure EGR loop and a high pressure EGR valve in a high pressure EGR loop.

17. The system of claim 12, wherein:
the exhaust system includes a turbocharger and an exhaust throttle;
the EGR system includes a low pressure EGR loop including a low pressure EGR valve and a high pressure EGR loop including a high pressure EGR valve;
the plurality of actuators include actuators associated with each of the turbocharger, the exhaust throttle, the low pressure EGR valve, and the high pressure EGR valve; and
wherein the controller is configured to control a position of the plurality of actuators in response to the one or more control commands.

18. An apparatus, comprising:
an electronic controller in operative communication with a plurality of sensors operable to provide signals indicative of operational parameters of a system, the system including an engine and an air handling system operationally coupled to the engine, the air handling system including an exhaust system and an intake system connected by an exhaust gas recirculation (EGR) system, the intake system structured to provide a charge flow to the engine, wherein the electronic controller includes:
a real-time system condition module structured to determine a first set of operational parameters and a second set of operational parameters of the system based upon the signals provided by the plurality of sensors;
a reference generation module structured to determine one or more feedforward references for the charge air flow and an EGR flow in response to the first set of operational parameters;
a reference governor module structured to determine adjustments to the one or more feedforward references in response to the second set of operational parameters;
a feedback control module structured to determine one or more actuator control commands in response to the one or more adjusted feedforward references and current references for the charge flow and the EGR flow; and
an air handling system controls module structured to control a position of the one or more actuators in response to the one or more actuator control commands.

19. The apparatus of claim 18, wherein the second set of operational parameters includes an actual engine out NOx amount and an engine out NOx constraint and the one or more actuator control commands are provided to position the one or more actuators to control an EGR valve in the EGR system and an exhaust throttle in the exhaust system.

20. The apparatus of claim 18, wherein the exhaust system includes an EGR loop including an EGR valve, wherein the at least one of the air handling system control command and the air handling system diagnostic command further comprises an EGR valve position command.

* * * * *